N. WEILER.
DRAFT DEVICE FOR WHEELED GANG PLOWS.
APPLICATION FILED MAY 19, 1911.
1,042,733.
Patented Oct. 29, 1912.
2 SHEETS—SHEET 1.
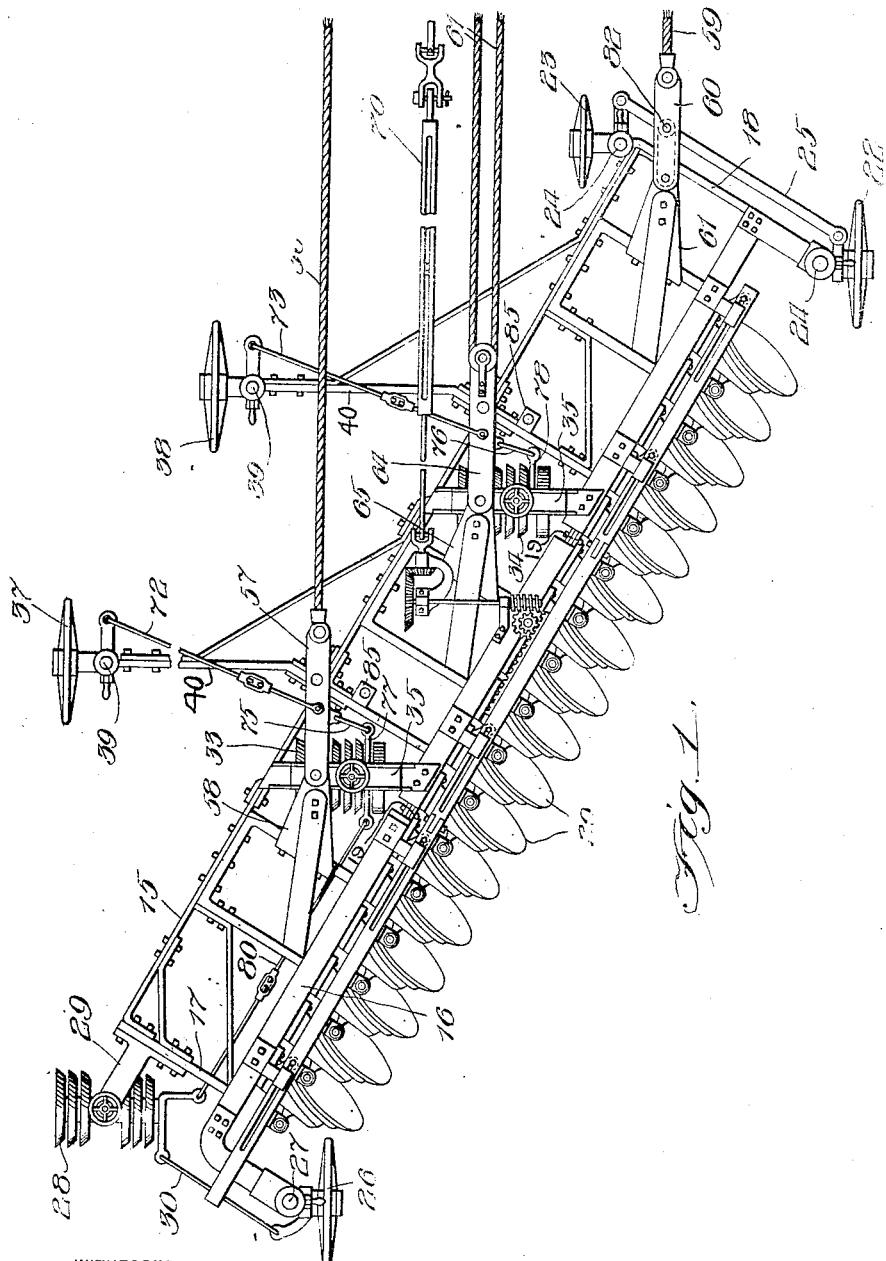
WITNESSES
Harry S. Gaither
William Goldberger.
INVENTOR
Nicholas Weiler
William L. Hall,
Atty

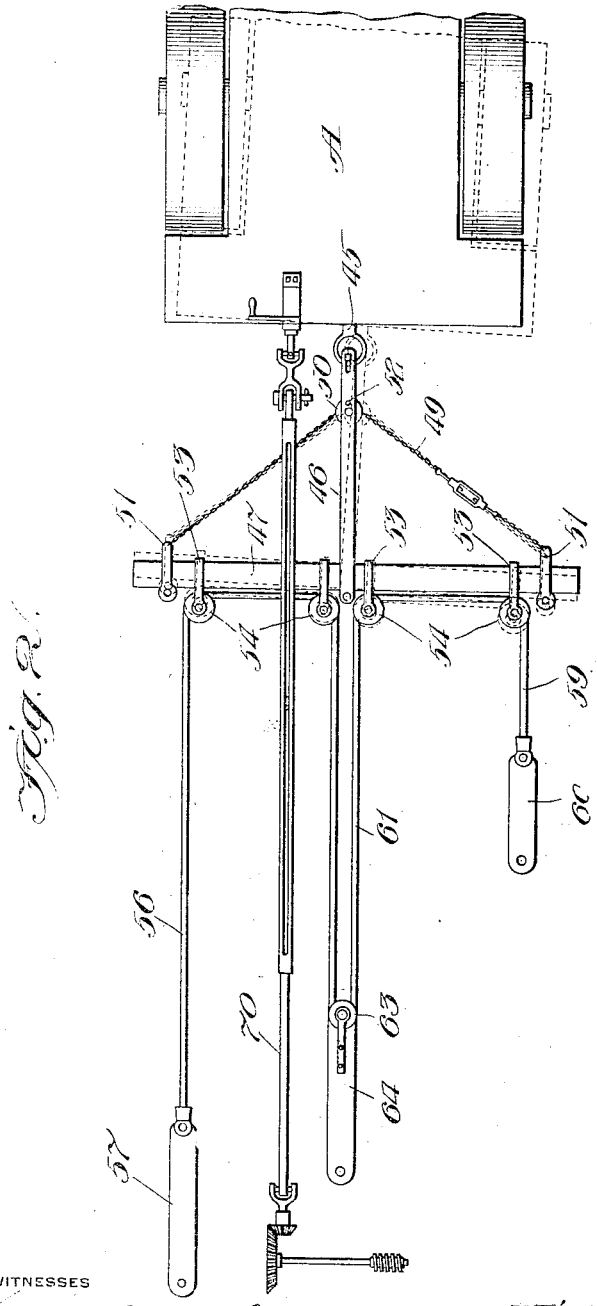

UNITED STATES PATENT OFFICE.

NICHOLAS WEILER, OF CANTON, ILLINOIS, ASSIGNOR OF ONE-HALF TO B. L. SHRADER, OF PLAINVILLE, TEXAS.

DRAFT DEVICE FOR WHEELED GANG-PLOWS.

1,042,733.  Specification of Letters Patent.  Patented Oct. 29, 1912.

Original application filed February 8, 1911, Serial No. 607,312. Divided and this application filed May 19, 1911. Serial No. 628,336.

*To all whom it may concern:*

Be it known that I, NICHOLAS WEILER, a citizen of the United States, and a resident of Canton, in the county of Fulton and State of Illinois, have invented certain new and useful Improvements in Draft Devices for Wheeled Gang-Plows; and I do hereby declare that the following is a full, clear, and exact description thereof, reference being had to the accompanying drawings, and to the characters of reference marked thereon, which form a part of this specification.

This invention relates to improvements in equalizing draft devices for motor drawn gang plows arranged to avoid pulling the plow out of the straight line of draft upon slight deviations of the engine or motor.

The invention consists in the matters hereinafter set forth and more particularly pointed out in the appended claims.

As shown in the drawings, Figure 1 is a plan view of a gang plow equipped with my improvements, showing the draft connections partially broken away. Fig. 2 is a plan view illustrating the draft connections between the plow and engine.

My improvements are herein shown as applied to a disk gang plow of the construction illustrated in my prior application for United States Letters Patent, Serial Number 607,312, filed February 8th, 1911, of which the present application is a division.

Such parts of the general construction of the plow only as are necessary to an understanding of the present invention are herein illustrated, but it will be understood that the invention is not limited to plows of this or any particular construction.

The frame of the plow shown in Fig. 1 is an oblong rectangular frame comprising the front and rear members 15 and 16, respectively, and the end members 17 and 18. The said frame comprises a plurality of sections which are jointed or hinged at 19 in the manner shown in my aforesaid application, to permit the plow to adapt itself to uneven ground. The rear member may support a series of disk plows 20 in a manner illustrated in my aforesaid prior application and said plows are adapted to be raised and lowered by means which constitute no part of the present invention and need not be hereinfurther described. The front end of the frame is supported on the furrow wheel and the land wheel 22, 23, respectively, mounted on stub axles that are pivoted at 24 at the forward end of the frame and said stub axles are connected by the link 25 to cause the axles and wheels to swing together. The wheel 22 is a furrow wheel to travel in the furrow, and the wheel 23 travels on the land. The rear end of the frame is supported by a furrow wheel 26 mounted on a stub axle which is pivoted at 27 to the rear end of the frame, and said rear end of the frame is supported also by a draft regulating and supporting roller 28 that travels on the land and is centrally pivoted to a bracket or extension 29 at the rear end of the plow frame. The said rear furrow wheel 26 and the draft regulating and supporting roller 28 are connected by a link 30 to cause said supporting members to swing in unison, as shown in Fig. 1. The plow frame is supported at points intermediate the front and rear ends thereof on other draft regulating and supporting rollers 33, 34 made like the draft regulating and supporting rollers shown in my aforesaid application and centrally pivoted to oblique frame members 35, 35 of the plow frame. 37, 38 designate land supporting wheels which are mounted on stub axles that are pivoted at 39 to lateral extensions or braced arms 40, 40 of the plow frame. Referring now to the connections between the plow frame thus arranged and supported and the motor or engine for drawing the same forwardly, these parts are made as follows: The draw bar 45 of the engine A is connected by a link 46 with a transversely arranged equalizing bar 47, said link being pivotally connected to said draw bar and equalizing bar and connected centrally to the equalizing bar. The said link 46 is connected to the ends of the equalizing bar 47 by a chain 49, the chain being trained between its ends over a sheave 50 near the front end of the link 46 and being attached to the ends of the equalizing bar at 51. The said chain is arranged to be normally locked to the equalizing bar by a pin 52 (Fig. 2) which is dropped through the bar 46 and through one of the links of the chain 49. This pin may be removed to permit the bar 46 to be swung sidewise relatively to the chain when coupling the engine to the plow. Mounted on the equalizing bar 47 and connected thereto by clevises 53 are a plurality of sheaves 54, 54, there being one located at each end of the equalizing bar and a pair located at the center of said bar. Trained through said sheaves 54 is a draft chain or cable, one end 56 of which is attached to a draft bar 57 which is pivotally connected to a draft plate 58 attached in any suitable manner to the plow frame in rear of its longitudinal center; and the other end 59 of said chain or cable is attached to a similar draft bar 60 which is pivoted to a like draft plate 61 connected to the frame near the front end thereof. The ends 56, 59 of said chain or cable are trained over the end sheaves 54 of the equalizing bar 47, and the central or looped portion 61 of said chain or cable is trained about the central pair of sheaves 54 of the equalizing bar 47 with the bight of said looped portion of the chain or cable trained about a sheave 63 which is mounted on the forward end of a third draw bar 64 that is pivotally connected to a draft plate 65 that is attached to the plow frame between the draft plates 58 and 61.

The plow is drawn forwardly askew, or with the longitudinal axis of the frame disposed obliquely to the line of draft, so that the succeeding rear plows or disks 20 will follow each other parallel to the line of draft, with each plow slightly at one side of the plow in front thereof.

In case the engine A should turn slightly from a direct line of travel, as indicated by the dotted lines in Fig. 2, the equalizing bar 47 will be swung obliquely to the line of draft, but the draft chain or cable will shift in the guide sheaves, the longer end 56 paying out to increase its length and the shorter end being taken up or shortened to decrease its length. There is no tendency, therefore, upon slight swerving of the pulling engine or motor, for the rear end of the plow to be swung out of the line of draft in a manner to increase the angle of the plow frame to the normal line of draft and thereby imperfectly plow the ground, such as would occur if the draft connections were non-equalizing. This feature of the invention may be applied to gang plows of different construction where there is a tendency, upon slight turning of the engine, to swing the plow out of the line of draft.

A telescopic, flexible actuating member 70 extends rearwardly from the engine to the plow, the rear end thereof being connected to the plow lifting devices at the plow and the front end being connected at its forward end to the engine or motor, whereby the plows may be lifted from the ground, as fully set forth in my aforesaid prior application.

When the plow is to be moved from place to place over a roadway the actuating member 70 is disconnected from the engine, and the draft link 46 is disconnected from the draw bar of the engine. The engine may then be hitched directly to the front end of the plow frame, as to the forwardmost draft bar 60, so as to draw the frame forwardly in the line of its longitudinal axis. In order that the supporting wheels and rollers may trail and be held in paths parallel to the line of travel of the plow frame when on the road, and may trail and be held in paths parallel to the line of draft of the plow when the plow is in operation in the field, I may connect the several rolling supporting elements in a manner which will now be described.

The front furrow and land wheels 22 and 23, respectively, are connected, as before stated, by the link 25, and the rear furrow wheel 26 and rear supporting and holding roller 28 are connected by the link 30 (Fig. 1). The swinging stub axles of the land wheels 37, 38 are connected by links 72, 73 with the draft bars 57 and 64, respectively, and said draft bars are connected by the short links 75, 76, respectively, with arms 77, 78 connected to the pivots of the supporting and holding rollers 33, 34. The supporting and holding roller 33 is connected by a link 80 to the rear land holding and supporting roller 28 and the rear furrow wheel 26. The forwardmost draft bar 60 is releasably connected to the link 25 which extends between and connects the swinging axles of the front ground and land wheels 22, 23, respectively, by means of a pin 82 which may be dropped through an opening in said draft bar and said link.

When the plow is to be adjusted for traveling on the road, the pin 82 is removed from the forward draft bar 60 and link 25, and the draft bar 60 is permitted to swing freely. The other draft bars 57 and 64 may be swung over fixed brackets 85, 85, fixed to the plow frame at the sides of said draft bars, so as to be parallel with the longitudinal axis of the frame, and said draft bars and brackets are apertured, as shown in Fig. 1, to receive pins by which the parts are locked together. When the draft bars 57 and 64 are thus swung to the center of the frame, all of the rollers 28, 33 and 34, and the wheels 26, 37 and 38 are swung into positions parallel with the axis of the plow frame. When the engine is hitched to the frame. When the forwardmost draft bar 60, said bar is swung into line with the plow frame and the forward furrow and land wheels 22, 23, respectively, automatically find their positions in line with the longitudinal axis of the plow frame.

Thus it will be observed that when the plow is adjusted for operation in the field, the forwardmost land and furrow wheels 22 and 23 are locked in positions parallel with the line of draft of the plow and the supporting and holding rollers 28, 33 and 34, as well as the rear furrow wheel 26 and the land wheels 37 and 38, are automatically brought and maintained in parallel relation with the line of draft of the plow frame.

It will be obvious that the construction described is capable of considerable variation within the spirit and scope of the invention, and the invention is not limited to the specific details of construction shown, except as hereinafter made the subject of specific claims.

I claim as my invention:—

1. The combination with a wheeled gang plow and an engine for pulling the same, of a draft connection between the engine and plow embracing a flexible draft device connected at its ends to the plow frame, and an equalizing bar connected to the engine between the engine and plow provided with sheaves about which said flexible draft device is trained.

2. The combination with a wheeled gang plow comprising a plurality of sections arranged one in rear of the other with respect to the line of draft and an engine for pulling the same, of an equalizing draft connection between the engine and plow comprising a flexible draft device, as a flexible member attached at its ends to the end sections of the plow frame, an equalizing bar connected to the engine between the same and plow and sheaves carried by the bar through which said flexible draft device is trained.

3. The combination with a wheeled gang plow having an equalizing bar and an engine for pulling the same, of a draft link pivotally connected to the equalizing bar centrally of the latter and connected to the engine, a chain attached to the ends of the equalizing bar and trained about a sheave carried by said link, and having means for locking it to the link, a flexible draft device and other sheaves carried by the equalizing bar about which the intermediate part of said flexible draft device is trained.

4. The combination with a wheeled gang plow comprising a plurality of sections arranged one in rear of the other with respect to the line of draft and an engine for pulling the same, of an equalizing draft connection between the engine and plow comprising a flexible draft device attached at its ends to the end sections of the plow frame, a sheave on an intermediate section of the plow frame, an equalizing bar connected to the engine between the same and the plow, and sheaves carried by the equalizing bar, one at each end thereof and others between the ends of said bar, said flexible draft device being trained between its ends about the sheave on the plow frame and the sheaves of the equalizing bar.

5. A gang plow comprising a frame and plows supported thereby with a set of draft regulating and supporting elements, and pulling means for the plow, of a draft device consisting of a single cable or chain and an equalizing bar connected with the frame in a manner to maintain the plow in a line of draft regardless of a slight change of direction of the pulling means.

In testimony, that I claim the foregoing as my invention I affix my signature in the presence of two witnesses, this fifteenth day of May A. D. 1911.

NICHOLAS WEILER.

Witnesses:
 H. E. McCARNEY,
 H. R. JOHNSON.